United States Patent
Byun

(10) Patent No.: US 10,747,469 B2
(45) Date of Patent: Aug. 18, 2020

(54) MEMORY SYSTEM AND OPERATING METHOD OF THE SAME

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 88 days.

(21) Appl. No.: 15/897,284

(22) Filed: Feb. 15, 2018

(65) Prior Publication Data

US 2019/0018613 A1    Jan. 17, 2019

(30) Foreign Application Priority Data

Jul. 17, 2017    (KR) .................. 10-2017-0090257

(51) Int. Cl.
*G06F 3/06* (2006.01)

(52) U.S. Cl.
CPC ............ *G06F 3/0659* (2013.01); *G06F 3/061* (2013.01); *G06F 3/0611* (2013.01); *G06F 3/0631* (2013.01); *G06F 3/0644* (2013.01); *G06F 3/0673* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 8,612,689 B2 | 12/2013 | Larkby-Lahet et al. | |
| 8,990,524 B2 | 3/2015 | Kramer | |
| 2006/0069871 A1* | 3/2006 | Gill | G06F 12/0862 |
| | | | 711/118 |
| 2012/0324168 A1* | 12/2012 | Rempel | G06F 21/71 |
| | | | 711/127 |
| 2017/0242583 A1* | 8/2017 | Yang | G06F 3/061 |
| 2018/0293174 A1* | 10/2018 | Song | G06F 12/0246 |

FOREIGN PATENT DOCUMENTS

| | | |
|---|---|---|
| KR | 1020130019567 | 2/2013 |
| KR | 101587579 | 1/2016 |

* cited by examiner

*Primary Examiner* — Charles J Choi
(74) *Attorney, Agent, or Firm* — IP & T Group LLP

(57) ABSTRACT

A memory system includes: a memory device that includes a plurality of memory dies each of which includes a plurality of planes, each of which includes a plurality of memory blocks that store data; and a controller including a first memory, and configured to: receive a plurality of commands from a host; perform command operations corresponding to the received commands in the memory blocks; detect patterns of the commands, the command operations, and user data corresponding to the command operations; dynamically allocate as pattern zones the first memory based on the patterns; and load map segments of map data corresponding to the commands, the command operations, and the user data into the pattern zones.

20 Claims, 13 Drawing Sheets

MEMORY SYSTEM AND OPERATING METHOD OF THE SAME

CROSS-REFERENCE TO RELATED APPLICATIONS

The present application claims priority of Korean Patent Application No. 10-2017-0090257, filed on Jul. 17, 2017, which is incorporated herein by reference in its entirety.

BACKGROUND

1. Field

Exemplary embodiments of the present invention relate to a memory system, and more particularly, to a memory system capable of processing data with a memory device and a method for operating the memory system.

2. Description of the Related Art

The paradigm for computing environments is shifting toward ubiquitous computing which allows users to use computer systems anytime anywhere. For this reason, the demands for portable electronic devices, such as mobile phones, digital cameras and laptop computers are soaring. Those electronic devices generally include a memory system using a memory device as a data storage device. The data storage device may be used as a main memory unit or an auxiliary memory unit of a portable electronic device.

Since the data storage device using a memory device is not provided with a mechanical driving unit, it may have excellent stability and durability. Also, the data storage device has a quick data access rate with low power consumption. Non-limiting examples of the data storage device having such advantages include Universal Serial Bus (USB) memory devices, memory cards of diverse interfaces, Solid-State Drives (SSD) and the like.

SUMMARY

Embodiments of the present invention are directed to a memory system and a method for operating the memory system that are capable of processing data with a memory device rapidly and stably by minimizing complexity and performance deterioration of the memory system and maximizing the utility efficiency of the memory device.

In accordance with an embodiment of the present invention, a memory system includes: a memory device that includes a plurality of memory dies each of which includes a plurality of planes, each of which includes a plurality of memory blocks that store data; and a controller including a first memory, and configured to: receive a plurality of commands from a host; perform command operations corresponding to the received commands in the memory blocks; detect patterns of the commands, the command operations, and user data corresponding to the command operations; dynamically allocate as pattern zones the first memory based on the patterns; and load map segments of map data corresponding to the commands, the command operations, and the user data into the pattern zones.

The controller loads map segments of a first map data corresponding to a first pattern among the patterns into a first pattern zone among the pattern zones, and loads map segments of a second map data corresponding to a second pattern among the patterns into a second pattern zone among the pattern zones.

The first pattern is a pattern that informations on the commands, the command operations, and the user data are discontinuous, and the second pattern is a pattern that informations on the commands, the command operations, and the user data are continuous.

The controller reads each of the map segments of the first map data based on a first unit size from the memory blocks, and loads each of the read map segments of the first map data into the first pattern zone based on the first unit size.

The controller reads each map segment of the first unit size among the map segments of the first map data; stores the read map segment of the first unit size in buffers corresponding to at least one among the memory blocks, the planes, and the memory dies; and then loads the stored map segment of the first unit size into the first pattern zone.

The controller reads map segments of the second map data based on a second unit size from the memory blocks and loads the map segments into the second pattern zone based on the second unit size.

The controller reads all map segments of the second unit size among the map segments of the second map data; stores all the read map segments of the second unit size in buffers corresponding to at least one among the memory blocks, the planes, and the memory dies; and then loads all the stored map segments of the second unit size into the second pattern zone.

The controller reads all the map segments of the second unit size from the memory blocks through an interleaving method for the planes or the memory dies.

The map segments of the first map data that are loaded into the first pattern zone are managed by MRU (Most Recently Used) and LRU (Least Recently Used), and the map segments of the second map data that are loaded into the second pattern zone are managed according to performance of the command operations.

The controller detects whether background operations for the memory device or user data corresponding to the background operations are of the first pattern or the second pattern.

In accordance with another embodiment of the present invention, a method for operating a memory system includes: receiving a plurality of commands for a memory device that includes a plurality of memory dies, each of which includes a plurality of planes, each of which includes a plurality of memory blocks for storing data from a host; detecting patterns of the commands, the command operations corresponding to the commands, and user data corresponding to the command operations; dynamically allocating as pattern zones to a first memory based on the patterns; and loading map segments of map data corresponding to the commands, the command operations, and the user data into the pattern zones.

The loading of the map segments of the map data corresponding to the commands, the command operations, and the user data into the pattern zones includes: loading map segments of a first map data corresponding to a first pattern among the patterns into a first pattern zone among the pattern zones; and loading map segments of a second map data corresponding to a second pattern among the patterns into a second pattern zone among the pattern zones.

The first pattern is a pattern in which information on the commands, the command operations, and the user data are discontinuous, and the second pattern is a pattern in which information on the commands, the command operations, and the user data are continuous.

In loading of the map segments of the first map data corresponding to the first pattern among the patterns into the first pattern zone among the pattern zones, each of the map segments of the first map data is read based on a first unit size from the memory blocks, and each of the read map segments of the first map data is loaded into the first pattern zone based on the first unit size.

The loading of the map segments of the first map data corresponding to the first pattern among the patterns into the first pattern zone among the pattern zones includes: reading each map segment of the first unit size among the map segments of the first map data; storing the read map segment of the first unit size in buffers corresponding to at least one among the memory blocks, the planes, and the memory dies; and loading the map segment of the first unit size stored in the buffers into the first pattern zone.

In the loading of the map segments of the second map data corresponding to the second pattern among the patterns into the second pattern zone among the pattern zones, map segments of the second map data are read based on a second unit size from the memory blocks and the map segments are loaded into the second pattern zone based on the second unit size.

The loading of the map segments of the second map data corresponding to the second pattern among the patterns into the second pattern zone among the pattern zones includes: reading all map segments of the second unit size among the map segments of the second map data; storing all the read map segments of the second unit size in buffers corresponding to at least one among the memory blocks, the planes, and the memory dies; and loading all the map segments of the second unit size stored in the buffers into the second pattern zone.

In the reading of all the map segments of the second unit size among the map segments of the second map data, all the map segments of the second unit size are read from the memory blocks through an interleaving method for the planes or the memory dies.

The map segments of the first map data that are loaded into the first pattern zone are managed by MRU (Most Recently Used) and LRU (Least Recently Used), and the map segments of the second map data that are loaded into the second pattern zone are managed according to performance of the command operations.

The method may further include: detecting whether background operations for the memory device or user data corresponding to the background operations are of the first pattern or the second pattern.

In accordance with another embodiment of the present invention, a method for operating a controller includes: controlling a memory device to provide groups of map segments; loading the provided map segments by dynamically allocating buffer spaces of the controller for the respective groups based on continuous and discontinuous patterns of operands related to operations to be performed by the memory device, the patterns respectively corresponding to the groups; and controlling the memory device to perform one or more of the operations according to the loaded groups, wherein the respective groups are provided and loaded in different units of sizes.

DETAILED DESCRIPTION

Figure 1:
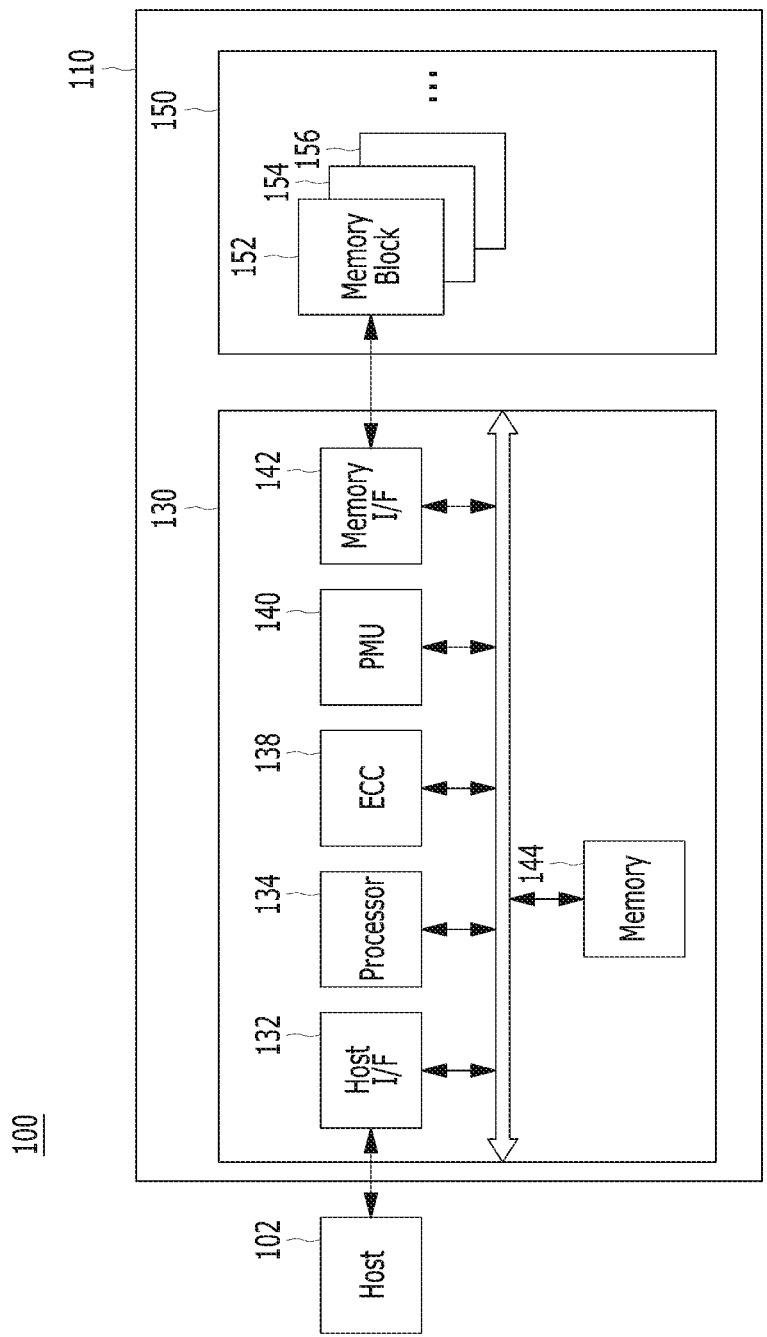
FIG. 1 is a block diagram illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may be any suitable electronic device including a portable electronic device such as a mobile phone, an MP3 player and a laptop computer or a non-portable electronic device such as a desktop computer, a game machine, a TV and a projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use, purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request received from the host 102. Non-limited examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), a reduced size MMC (RS-MMC) and a micro-MMC. The SD card may include a mini-SD card and micro-SD card.

The memory system 110 may employ various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control storing data into the memory device 150 and reading data from the memory device 150 and transferring the read data to the host HOST.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

Meanwhile, the memory device 150 of the memory system 110 may retain data stored therein even though a power source is cut off. Particularly, the memory device 150 may store the data transferred from the host 102 through a write operation, and transfer the data stored therein to the host 102 through a read operation. Herein, the memory device 150 may include a plurality of memory blocks 152, 154 and 156, and each of the memory blocks 152, 154 and 156 may include a plurality of pages. Each of the pages may include a plurality of memory cells that are coupled to a plurality of word lines WL. Also, the memory device 150 may include a plurality of planes each of which includes the memory blocks 152, 154 and 156. Particularly, the memory device 150 may include a plurality of memory dies each of which includes a plurality of planes. Also, the memory device 150 may be a non-volatile memory device, e.g., a flash memory. Herein, the flash memory may be a three-dimensional (3D) stereoscopic stack structure.

Herein, the structure of the memory device 150 and the 3D stereoscopic stack structure of the memory device 150 will be described in detail below with reference to FIGS. 2 to 4, and the memory device 150 including a plurality of memory dies, each of which includes a plurality of planes, each of which includes a plurality of memory blocks 152, 154 and 156 will be described later in detail below with reference to FIG. 6. Therefore, further description will not be provided herein.

The controller 130 of the memory system 110 may control the memory device 150 in response to a request from the host 102. For example, the controller 130 may provide the host 102 with data that are read from the memory device 150 and store the data transferred from the host 102 in the memory device 150. To this end, the controller 130 may control a read operation, a write operation, a program operation and an erase operation of the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through any suitable method included a coded modulation such as Low-Density Parity Check (LDPC) code, Bose-Chaudhuri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices needed for error correction.

The PMU 140 may provide and manage power of the controller 130. Any suitable PMU may be employed.

The NFC 142 is an example of a suitable memory/storage interface for interfacing the controller 130 and the memory device 150 such that the controller 130 controls the memory device 150 in response to a request from the host 102, when the memory device is a NAND flash memory. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150. A suitable memory/storage interface may be selected depending upon the type of the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random-access memory (SRAM) or dynamic random-access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

Also, in the memory system in accordance with the embodiment of the present invention, for example, the controller 130 may perform a plurality of command operations corresponding to a plurality of commands received from the host 102 in the memory device 150. For example, the controller 130 may perform a plurality of program operations corresponding to a plurality of write commands, a plurality of read operations corresponding to a plurality of read commands, and a plurality of erase operations corresponding to a plurality of erase commands in the memory device 150. Also, as the command operations are performed, the controller 130 may update metadata, particularly, map data. For example, in the memory system in accordance with the embodiment of the present invention, when the controller 130 receives a plurality of commands from the host 102, particularly, when the controller 130 receives a plurality of read commands or write commands from the host 102, the controller 130 may detect a pattern of the read commands or the write commands, a pattern of the read operations or write operations corresponding to the read commands or write commands, or a pattern of data corresponding to the read operations or write operations, load metadata, particularly, map data, corresponding to the read operations or write operations in the memory 144 of the controller 130 based on the detected pattern. At this time, the controller 130 may allocate pattern zones in the memory 144 of the controller 130 based on the detected pattern, and load the map data into the corresponding pattern zones. Also, in the memory system in accordance with the embodiment of the present invention, when the controller 130 performs background operations onto the memory device 150, the controller 130 may detect the pattern of the background operations or the pattern of data corresponding to the background operations, load metadata, particularly, map data, corresponding to the background operations, into the memory 144 of the controller 130 based on the detected pattern. At this time, the controller 130 may allocate pattern zones in the memory 144 of the controller 130 based on the detected pattern, and load the map data to the corresponding pattern zones. Herein, in the memory system in accordance with the embodiment of the present invention, since the management operations performed after the command operations corresponding to the commands received from the host 102 are performed and the map data corresponding to the command operations are loaded will be described later in detail with reference to FIGS. 5 to 9, further description on it is not provided herein.

Also, the processor 134 of the controller 130 may include a management unit (not shown) for performing a bad management of the memory device 150, and the management unit may detect a bad block in a plurality of memory blocks 152, 154 and 156 that are included in the memory device 150, and perform the bad management of treating the detected bad block as a bad block. Herein, the bad management may mean that when the memory device 150 is a flash memory, e.g., a NAND flash memory, a program failure may occur during a data program operation due to the characteristics of NAND, and the memory block where the program failure has occurred may be treated as a bad block and then the data that has failed to be programmed may be written, i.e., programmed, in a new memory block with. Also, as described above, when the memory device 150 has a three-dimensional stereoscopic stack structure and a program failure occurs and the block where the program failure has occurred is treated as a bad block, the utility efficiency of the memory device 150 and the reliability of the memory system 110 are dropped drastically. Therefore, it is required to perform a more reliable bad block management. Hereafter, a memory device in the memory system in accordance with the embodiment of the present invention will be described in detail with reference to FIGS. 2 to 4.

Figure 2:
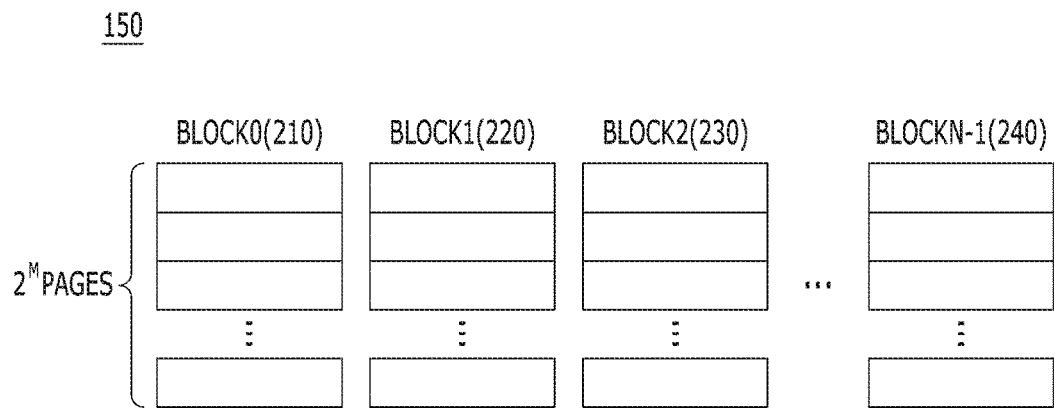
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N-1, and each of the blocks 0 to N-1 may include a plurality of pages, for example, $2^M$ pages, the number of which may vary according to circuit design. Memory cells included in the respective memory blocks 0 to N-1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
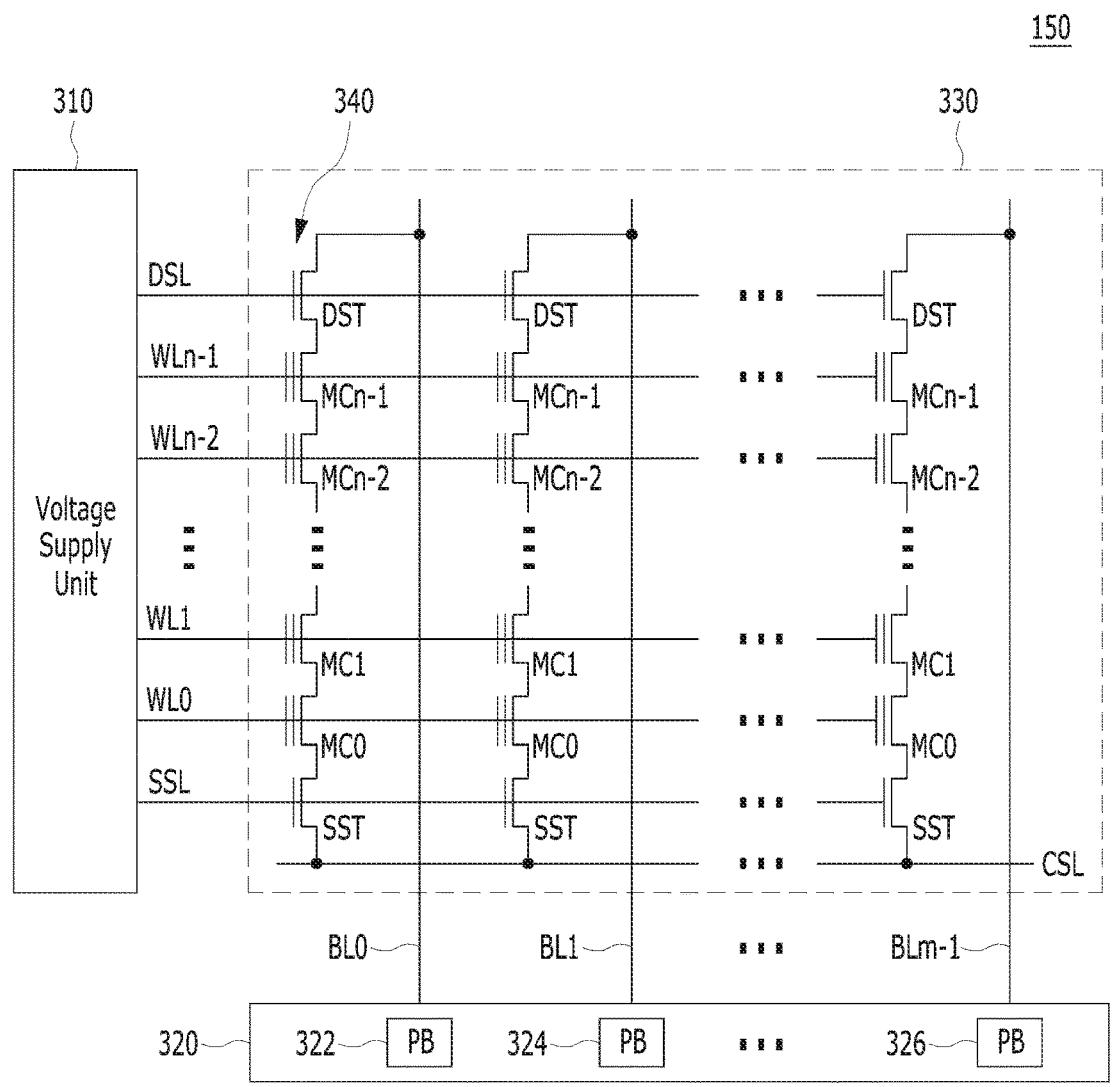
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm-1. The cell string 340 of each column may include one or more drain select transistors DST and one or more source select transistors SST. Between the drain and select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
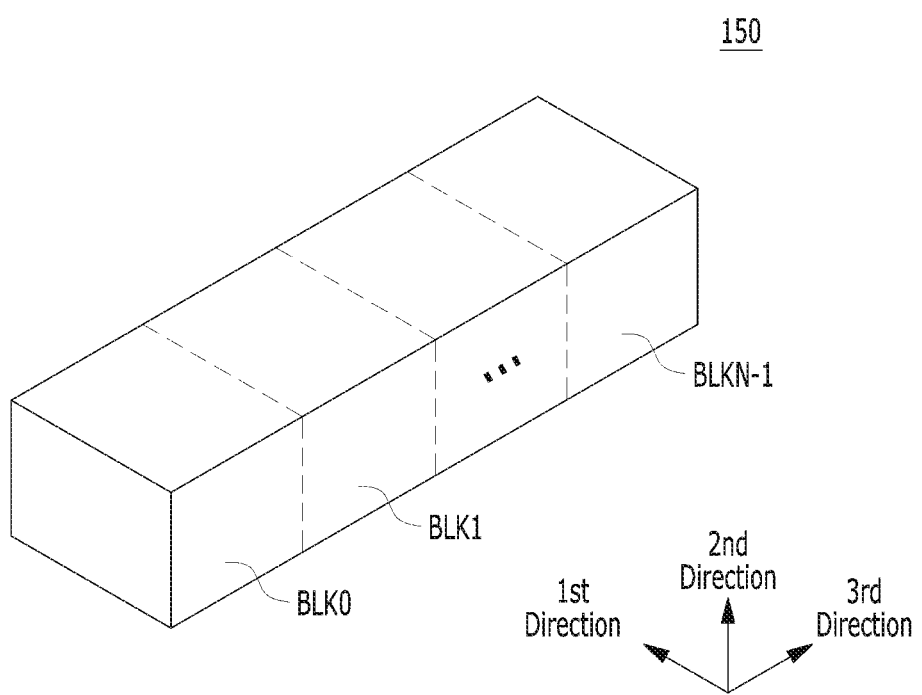
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

Hereafter, a data processing operation into a memory device in the memory system in accordance with the embodiment of the present invention with reference to FIGS. 5 to 9, particularly, a data processing operation performed when a plurality of commands are received from the host 102 and a plurality of command operations corresponding to the commands are performed, will be described in detail.

FIGS. 5 to 8 illustrate an example of a data processing operation when a plurality of command operations corresponding to a plurality of commands are performed in a memory system in accordance with an embodiment of the present invention. Herein, for the sake of convenience in description, a case where a plurality of commands are received from the host 102 in the memory system 110 shown in FIG. 1 and command operations corresponding to the commands are performed in the memory system in accordance with the embodiment of the present invention will be described in detail. For example, a case where a plurality of write commands are received from the host 102 and program operations corresponding to the write commands are performed, a case where a plurality of read commands are received from the host 102 and read operations corresponding to the read commands are performed, a case where a plurality of erase commands are received from the host 102 and erase operations corresponding to the erase commands are performed, or a case where a plurality of write commands and a plurality of read commands are received from the host 102 and program operations and read operations corresponding to the write commands and the read commands are performed is taken as an example and described in detail.

Also, in the memory system in accordance with the embodiment of the present invention, a case where write data corresponding to a plurality of write commands received from the host 102 are stored in a buffer/cache included in the memory 144 of the controller 130 and the data stored in the buffer/cache are programmed and stored in a plurality of memory blocks included in the memory device 150, which are program operations, and map data are updated upon the performance of the program operations into the memory device 150, and then the updated map data are stored in the memory blocks included in the memory device 150, which is a case where program operations corresponding to a plurality of write commands received from the host 102 are performed, is taken as an example and described. Also, a case where when a plurality of read commands are received from the host 102 for the data stored in the memory device 150, data corresponding to the read commands may be read from the memory device 150 by detecting map data of data corresponding to the read commands, and the read data are stored in the buffer/cache included in the memory 144 of the controller 130, and the data stored in the buffer/cache are provided from the host 102, that is, a case where read operations corresponding to the read commands received from the host 102 are performed is taken as an example and described in the embodiment of the present invention. Also, a case where when a plurality of erase commands are received from the host 102 for the memory blocks included in the memory device 150, the memory blocks corresponding to the erase commands are detected and the data stored in the detected memory blocks are erased and the map data corresponding to the erased data are updated and the updated map data are stored in the memory blocks included in the memory device 150 is taken as an example and described in the embodiment of the present invention. In short, a case where erase operations corresponding to the erase commands received from the host 102 are performed is taken as an example and described in the embodiment of the present invention.

Herein, it is assumed in the embodiment of the present invention for the sake of convenience in description that the command operations performed in the memory system 110 are performed by the controller 130. However, this is not more than an example and, as described above, the processor 134 included in the controller 130, e.g., the FTL, may perform the command operations. Also, in this embodiment of the present invention, the controller 130 may program and store the user data corresponding to the write commands received from the host 102 and metadata in some memory blocks among the memory blocks included in the memory device 150, read the user data corresponding to the read commands received from the host 102 and the metadata from the memory blocks storing the user data and the metadata among the memory blocks included in the memory device 150 and transfer the read user data and metadata to the host 102, or erase the user data corresponding to the erase commands received from the host 102 and the metadata from the memory blocks storing the user data and the metadata among the memory blocks included in the memory device 150.

Herein, the metadata may include a first map data including Logical to Physical (L2P) information (which is called logical information, hereafter) for the data stored in memory blocks through a program operation, and a second map data including Physical to Logical (P2L) information (which is called physical information, hereafter). Also, the metadata may include information on the command data corresponding to a command received from the host 102, information on a command operation corresponding to the command, information on the memory blocks of the memory device 150 where the command operation is performed, and information on the map data corresponding to the command operation. In other words, the metadata may include all the other informations and data except the user data corresponding to a command received from the host 102.

According to the embodiment of the present invention, the controller 130 may perform command operations corresponding to a plurality of commands received from the host 102. For example, when the controller 130 receives write commands from the host 102, the controller 130 may perform program operations corresponding to the write commands. Herein, the controller 130 may program and store user data corresponding to the write commands in the memory blocks of the memory device 150, such as empty memory blocks where an erase operation is performed, open memory blocks, or free memory blocks. Also, the controller 130 may program and store mapping information between the logical addresses and the physical addresses for the user data stored in the memory blocks (which are first map data including an L2P map table or an L2P map list containing logical information) and mapping information between the physical addresses and the logical addresses for the memory blocks storing the user data (which are second map data including a P2L map table or a P2L map list containing physical information) in the empty memory blocks, open memory blocks, or free memory blocks among the memory blocks included in the memory device 150.

When the controller 130 receives write commands from the host 102, the controller 130 may program and store user data corresponding to the write commands in the memory blocks and store metadata that includes the first map data and the second map data for the user data stored in the memory blocks in memory blocks. Particularly, since data segments of the user data are stored in the memory blocks of the memory device 150, the controller 130 may generate and update meta segments of the meta data, which are map segments of map data including L2P segments of the first map data and P2L segments of the second map data, and store them in the memory blocks of the memory device 150. Herein, the map segments stored in the memory blocks of the memory device 150 may be loaded onto the memory 144 of the controller 130 to be updated.

Also, when the controller 130 receives a plurality of read commands from the host 102, the controller 130 may read out the read data corresponding to the read commands from the memory device 150, store the read data in the buffer/cache included in the memory 144 of the controller 130, transfer the data stored in the buffer/cache to the host 102. In this way, read operations corresponding to the read commands may be performed.

Also, when the controller 130 receives a plurality of erase commands from the host 102, the controller 130 may detect memory blocks of the memory device 150 that correspond to the erase commands and perform erase operations onto the detected memory blocks. Hereafter, a data processing operation performed in the memory system in accordance with the embodiments of the present invention is described in detail with reference to FIGS. 5 to 8.

Figure 5:
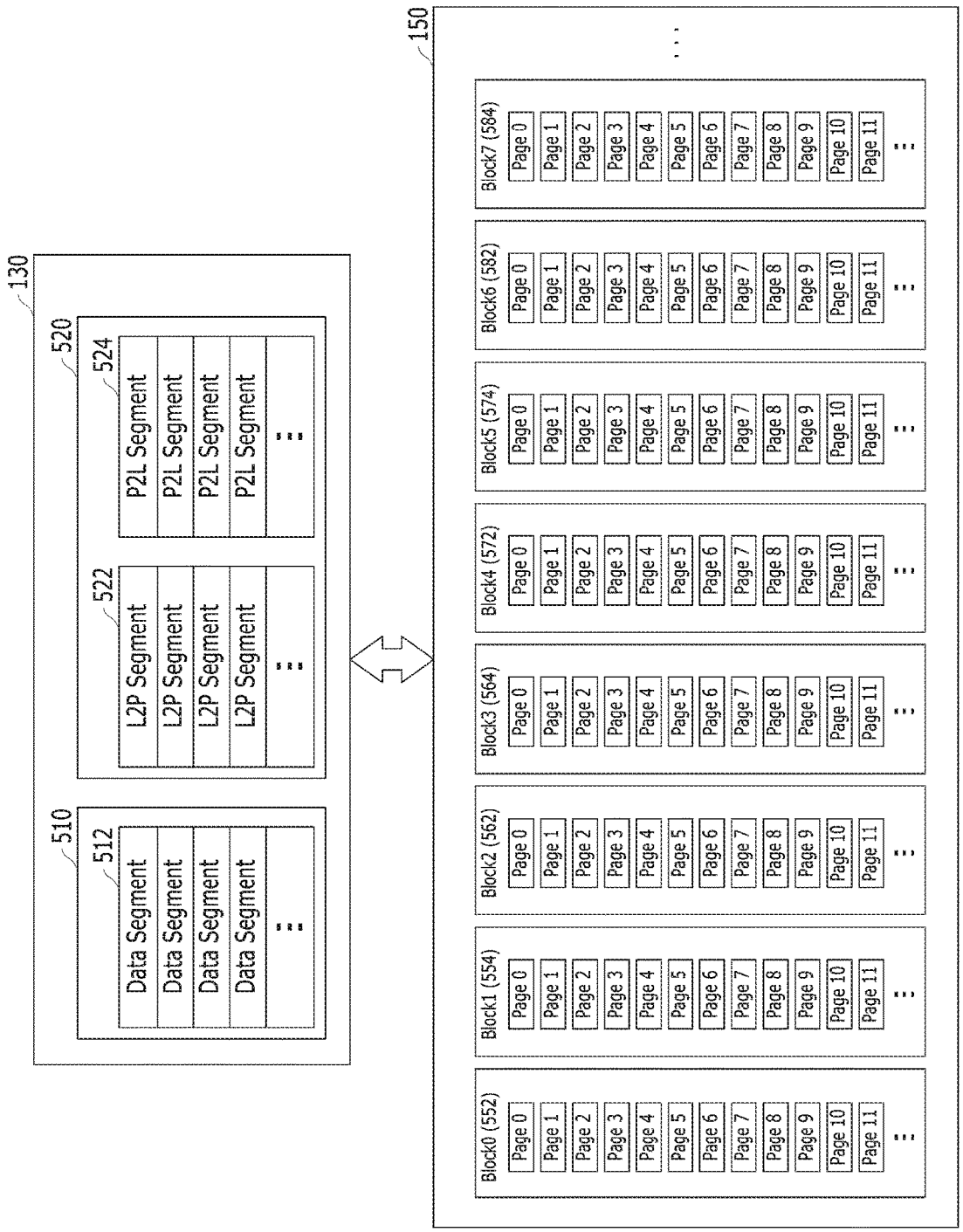
FIGS. 5 to 8 illustrate an example of a data processing operation when a plurality of command operations corresponding to a plurality of commands are performed in a memory system in accordance with an embodiment of the present invention.

First of all, referring to FIG. 5, the controller 130 may perform command operations corresponding to a plurality of commands received from the host 102. For example, the controller 130 may perform program operations corresponding to a plurality of write commands received from the host 102. Herein, the controller 130 may program and store user data corresponding to the write commands in memory blocks 552, 554, 562, 564, 572, 574, 582 and 584 of the memory device 150, and generate and update metadata for the user data when the program operation is performed onto the memory blocks 552, 554, 562, 564, 572, 574, 582 and 584, and then store the generated and updated metadata in the memory blocks 552, 554, 562, 564, 572, 574, 582 and 584 of the memory device 150.

Herein, the controller 130 may generate and update information representing that the user data are stored in the pages included in the memory blocks 552, 554, 562, 564, 572, 574, 582 and 584 of the memory device 150, e.g., the first map data and the second map data, and store the generated and updated information in the pages included in the memory blocks 552, 554, 562, 564, 572, 574, 582 and 584 of the memory device 150. In other words, the controller 130 may generate and update logical segments of the first map data, which include L2P segments, and physical segments of the second map data, which include P2L segments, and store the generated and updated logical segments in the pages included in the memory blocks 552, 554, 562, 564, 572, 574, 582 and 584 of the memory device 150.

For example, the controller 130 may cache and buffer the user data corresponding to the write commands received from the host 102 in the first buffer 510 included in the memory 144 of the controller 130, in other words, the controller 130 may store the data segments 512 of the user data in the first buffer 510, which is a data buffer/cache, and store the data segments 512 stored in the first buffer 510 in the pages included in the memory blocks 552, 554, 562, 564, 572, 574, 582 and 584 of the memory device 150. Since the data segments 512 of the user data corresponding to the write commands received from the host 102 are programmed and stored in the pages included in the memory blocks 552, 554, 562, 564, 572, 574, 582 and 584 of the memory device 150, the controller 130 may generate and update the first map data and the second map data and store them in the second buffer 520 included in the memory 144 of the controller 130. In short, the controller 130 may store the L2P segments 522 of the first map data and the P2L segments 524 of the second map data for the user data in the second buffer 520, which is a map buffer/cache. Herein, as described above, the L2P segments 522 of the first map data and the P2L segments 524 of the second map data or a map list for the L2P segments 522 of the first map data and a map list for the P2L segments 524 of the second map data may be stored in the second buffer 520 in the memory 144 of the controller 130. Also, the controller 130 may store the L2P segments 522 of the first map data and the P2L segments 524 of the second map data that are stored in the second buffer 520 in the pages stored in the memory blocks 552, 554, 562, 564, 572, 574, 582 and 584 of the memory device 150.

Also, the controller 130 may perform command operations corresponding to a plurality of commands received from the host 102. For example, the controller 130 may perform read operations corresponding to a plurality of read commands received from the host 102. Herein, the controller 130 may load and check out the map segments of the map data for the user data corresponding to the read commands, e.g., the L2P segments 522 of the first map data and the P2L segments 524 of the second map data, onto the second buffer 520, and then read the user data stored in the pages of the corresponding memory blocks among the memory blocks 552, 554, 562, 564, 572, 574, 582 and 584 of the memory device 150, store the data segments 512 of the read user data in the first buffer 510, and transfer them to the host 102.

Also, the controller 130 may perform command operations corresponding to a plurality of commands received from the host 102. In other words, the controller 130 may perform erase operations corresponding to a plurality of erase commands received from the host 102. Herein, the controller 130 may detect memory blocks corresponding to the erase commands among the memory blocks 552, 554, 562, 564, 572, 574, 582 and 584 of the memory device 150, and perform the erase operations onto the detected memory blocks.

When a background operation, for example, an operation of copying data or swapping data from the memory blocks included in the memory device 150, such as a garbage collection operation or a wear-leveling operation, is performed, the controller 130 may store the data segments 512 of the corresponding user data in the first buffer 510, store the map segments 522 and 524 of the map data corresponding to the user data in the second buffer 520, and perform the garbage collection operation or the wear-leveling operation.

Figure 6:
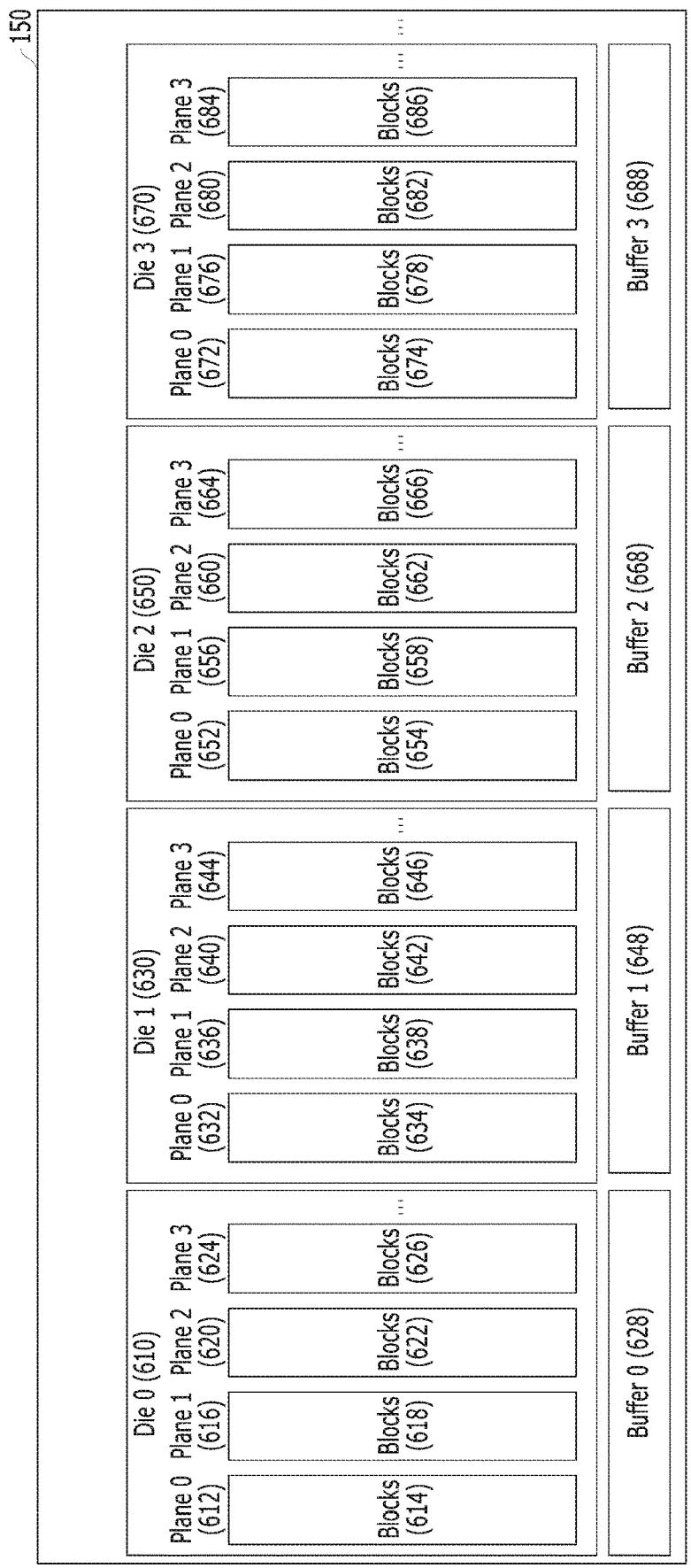

Also, referring to FIG. 6, the memory device 150 may include a plurality of memory dies, e.g., a memory die 0 610, a memory die 1 630, a memory die 2 650, and a memory die 3 670. Each of the memory dies 610, 630, 650 and 670 may include a plurality of planes. For example, the memory die 0 610 may include a plane 0 612, a plane 1 616, a plane 2 620 and a plane 3 624. The memory die 1 630 may include a plane 0 632, a plane 1 636, a plane 2 640 and a plane 3 644. The memory die 2 650 may include a plane 0 652, a plane 1 656, a plane 2 660 and a plane 3 664. The memory die 3 670 may include a plane 0 672, a plane 1 676, a plane 2 680 and a plane 3 684. Each of the planes 612, 616, 620, 624, 632, 636, 640, 644, 652, 656, 660, 664, 672, 676, 680 and 684 of the memory dies 610, 630, 650 and 670 included in the memory device 150 may include a plurality of memory blocks 614, 618, 622, 626, 634, 638, 642, 646, 654, 658, 662, 666, 674, 678, 682 and 686. For example, as described earlier with reference to FIG. 2, each of the planes 612, 616, 620, 624, 632, 636, 640, 644, 652, 656, 660, 664, 672, 676, 680 and 684 may include N blocks Block 0, Block 1, . . . , Block N-1 including a plurality of pages, e.g., $2^M$ pages. Also, the memory device 150 may include a plurality of buffers that respectively correspond to the memory dies 610, 630, 650 and 670. For example, the memory device 150 may include a buffer 0 628 corresponding to the memory die 0 610, a buffer 1 648 corresponding to the memory die 1 630, a buffer 2 668 corresponding to the memory die 2 650, and a buffer 3 688 corresponding to the memory die 3 670.

When command operations corresponding to a plurality of commands received from the host 102 are performed, data corresponding to the command operations may be stored in the buffers 628, 648, 668 and 688 included in the memory device 150. For example, when program operations are performed, data corresponding to the program operations may be stored in the buffers 628, 648, 668 and 688, and then stored in the pages included in the memory blocks of the memory dies 610, 630, 650 and 670. When read operations are performed, data corresponding to the read operations may be read from the pages included in the memory blocks of the memory dies 610, 630, 650 and 670, stored in the buffers 628, 648, 668 and 688, and transferred to the host 102 through the controller 130.

Herein, in the embodiment of the present invention, for the sake of convenience in description, a case where the buffers 628, 648, 668 and 688 included in the memory device 150 exist in the outside of the corresponding memory dies 610, 630, 650 and 670 is taken as an example and described. However, the buffers 628, 648, 668 and 688 included in the memory device 150 may exist in the inside of the corresponding memory dies 610, 630, 650 and 670. Also, the buffers 628, 648, 668 and 688 may correspond to the planes 612, 616, 620, 624, 632, 636, 640, 644, 652, 656, 660, 664, 672, 676, 680 and 684 or the memory blocks 614, 618, 622, 626, 634, 638, 642, 646, 654, 658, 662, 666, 674, 678, 682 and 686 in the memory dies 610, 630, 650 and 670. In the embodiment of the present invention, for the sake of convenience in description, a case where the buffers 628, 648, 668 and 688 included in the memory device 150 are a plurality of page buffers 322, 324 and 326 included in the memory device 150 is described as an example, as described earlier with reference to FIG. 3. However, the buffers 628, 648, 668 and 688 included in the memory device 150 may be a plurality of caches or a plurality of registers included in the memory device 150.

Also, the memory blocks included in the memory device 150 may be grouped into a plurality of super memory blocks, and then command operations may be performed onto the super memory blocks. Herein, each of the super memory blocks may include a plurality of memory blocks, for example, memory blocks included in a first memory block group and a second memory block group. Herein, when the first memory block group is included in a first plane of a first memory die, the second memory block group may be included in the first plane of the first memory die or a second plane of the first memory die. Also, the second memory block group may be included in the planes of the second memory die. Hereafter, as described above, a case where a plurality of commands is received from the host 102 and command operations are performed, or when background operations are performed onto the memory device 150, metadata, particularly, map data, are loaded onto the memory 144 of the controller 130 and managed in the memory system in accordance with the embodiment of the present invention is taken as an example and described in detail with reference to FIGS. 7 and 8.

Figure 7:
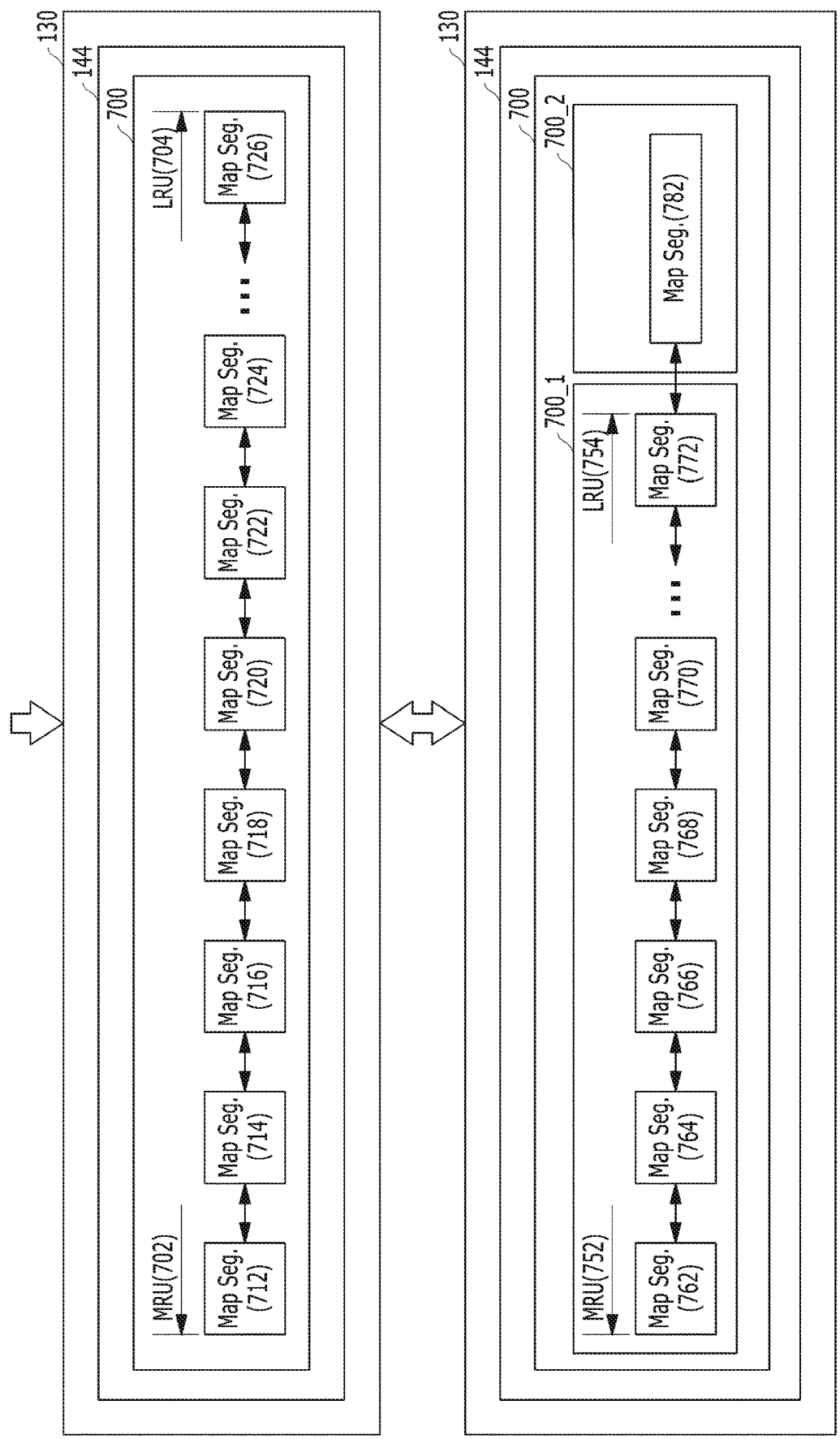

Referring to FIG. 7, when the controller 130 receives a plurality of commands, for example, a plurality of read commands, the controller 130 may perform a plurality of read operations corresponding to the read commands received from the host 102 to the memory blocks included in the memory device 150. In other words, as described above, the controller 130 may load map segments of map data for the user data corresponding to the read commands received from the host 102 in the second buffer 520 included in the memory 144 of the controller 130, check out the map segments, read the user data from the memory blocks included in the memory device 150, store the read user data in the first buffer 510 included in the memory 144 of the controller 130, and transfer the user data to the host 102.

Herein, for the sake of convenience in description, a case where a plurality of commands, particularly, a plurality of read commands, are received from the host 102 and then read operations corresponding to the read commands are performed in accordance with the embodiment of the present invention is taken as an example and described. However, the embodiment of the present invention may also be applied to a case of performing program operations or erase operations corresponding to a plurality of write commands or erase commands after a plurality of write commands or erase commands are received. Also, in accordance with the embodiment of the present invention, for the sake of convenience in description, a case where command operations corresponding to a plurality of commands received from the host 102 are performed is taken as an example and described. However, the embodiment of the present invention may also be applied to a case of performing background operations onto the memory device 150.

In short, in the memory system in accordance with the embodiment of the present invention, when the controller 130 receives a plurality of commands from the host 102, the controller 130 may detect the pattern of the commands received from the host 102, the pattern of the command operations corresponding to the commands, or the pattern of data corresponding to the command operations. Herein, the patterns of the commands, the command operations, or the data may include a first pattern, which is a normal pattern, and a second pattern, which is a sequential pattern, and they may be decided based on a command pattern of the commands received from the host 102, a performance pattern of the command operations performed in the memory device 150 according to the commands, or a data pattern of the data corresponding to the command operations, particularly, a data pattern of user data.

The normal pattern of the first pattern may represent discontinuous patterns of the information on the commands, the command operations or the user data. For example, the normal pattern of the first pattern may represent discontinuous patterns of command identification information, command operation, sequence information or memory block access information for accessing the memory blocks of the memory device 150, and logical information of user data, e.g., Logical Block Address (LBA) or Logical Page Number (LPN).

Also, the sequential pattern of the second pattern may represent continuous patterns of the information on commands, command operations, or user data. For example, the sequential pattern of the second pattern may represent continuous patterns of command identification information, command operation sequence information or memory block access information for accessing the memory blocks of the memory device 150, and logical information of user data, e.g., Logical Block Address (LBA) or Logical Page Number (LPN).

For example, the user data of the first pattern, which is the normal user data, may be user data, whose LBA or LPN number is one or equal to or less than a threshold number, having a data size of a threshold size or less. An example of the normal user data may be random user data. Also, the user data of the first pattern may be hot data, an access frequency to which is equal to or greater than a threshold value.

Also, the user data of the second pattern, which is the sequential user data, may be user data, which have a plurality of consecutive LBAs or LPNs and the number of LBAs or LPNs that is equal to or greater than a threshold number and have a data size that is equal to or greater than a threshold size. An example of the sequential user data may be consecutive user data. Also, the user data of the second pattern may be cold data, an access frequency to which is equal to or less than a threshold value.

Also, when the controller 130 receives a plurality of commands from the host 102, the controller 130 may decide whether a plurality of commands received from the host 102, e.g., a plurality of read commands, are normal read commands or sequential read commands; whether a plurality of command operations corresponding to the commands, e.g., read operations corresponding to the read commands, are normal read operations or sequential read operations; or whether the user data corresponding to the command operations, e.g., user data corresponding to the read operations, are normal read operations or sequential read operations. Also, when the controller 130 performs background operations onto the memory device 150, the controller 130 may detect the pattern of the background operations. Herein, the controller 130 may decide whether the background operations performed onto the memory device 150 are normal background operations or sequential background operations, or decide whether the user data corresponding to the background operations are normal user data or sequential user data.

As described above, the controller 130 may allocate map buffer or map cache (i.e., the second buffer 520 in the memory 144 of the controller 130), on which the map data for the user data are loaded, as a first pattern zone and a second pattern zone based on the detected first and second patterns of the commands received from the host 102 when a plurality of commands are received from the host 102 or of the background operations when the background operations are performed onto the memory device 150. The controller 130 may dynamically allocate as the first pattern zone or the first and second pattern zones, the map buffer or map cache included in the memory 144 of the controller 130 based on the first pattern and the second pattern.

Also, the controller 130 may load map segments of the map data corresponding to the command operations or background operations into the second buffer 520 included in the memory 144 of the controller 130 to perform the command operations or background operations. Particularly, the controller 130 may load the map segments of the map data corresponding to the first pattern into the allocated first pattern zone of the memory 144 of the controller 130, load the map segments of the map data corresponding to the second pattern to the allocated second pattern zone of the memory 144 of the controller 130, and manage the map segments that are loaded into the first pattern zone or the second pattern zone in the memory 144 of the controller 130. Hereafter, a case where the controller 130 receives a plurality of read commands from the host 102 is taken as an example and described in detail.

For example, when the controller 130 receives first group read commands from the host 102, the controller 130 may detect a pattern of the first group read commands, a pattern of first group read command operations corresponding to the first group read commands, or a pattern of first group data corresponding to the first group read command operations, particularly, first group user data. Herein, the controller 130 may detect that the first group read commands, the first group read command operations, or the first group user data are of the first pattern. In other words, the controller 130 may detect that the first group read commands are normal read commands, or the first group read command operations corresponding to the first group read commands are normal read operations, or the first group user data corresponding to the first group read command operations are normal user data.

The controller 130 may allocate as the first pattern zone of the second buffer 700 included in the memory 144 of the controller 130.

Also, the controller 130 may load map segments of first group map data for the first group user data into the memory 144 of the controller 130 to perform the first group read command operations, in other words, to read the first group user data from the memory device 150. Herein, since the first group read commands, the first group read command operations, or the first group user data are of the first pattern, the controller 130 may load the map segments 712, 714, 716, 718, 720, 722, 724 and 726 of the first group map data corresponding to the first pattern into the first pattern zone 700 in the memory 144 of the controller 130.

Herein, the map segments 712, 714, 716, 718, 720, 722, 724 and 726 of the first group map data corresponding to the first pattern may have a first unit size, e.g., a size of 2K, and the controller 130 may load each of the map segments 712, 714, 716, 718, 720, 722, 724 and 726 of the first group map data corresponding to the first pattern into the first pattern zone 700 by units of the first unit size.

In other words, when the map segments 712, 714, 716, 718, 720, 722, 724 and 726 of the first group map data do not exist in the first pattern zone 700 of the second buffer 700, the controller 130 may read the map segments 712, 714, 716, 718, 720, 722, 724 and 726 of the first group map data from the memory blocks of the memory device 150 and load them into the first pattern zone 700. Herein, as described above, the controller 130 may read the map segments 712, 714, 716, 718, 720, 722, 724 and 726 from the memory blocks of the memory device 150 and load them into the memory 144 of the controller 130 through a plurality of buffers 628, 648, 668 and 688 which respectively correspond to a plurality of memory dies, a plurality of planes, or a plurality of memory blocks in the memory device 150. Herein, each of the map segments 712, 714, 716, 718, 720, 722, 724 and 726 may be read from the memory blocks of the memory device 150 by units of the first unit size, and then the read map segments may be loaded into the memory 144 of the controller 130 by units of the first unit size through the page buffers. Since the loading operation of the map segments 712, 714, 716, 718, 720, 722, 724 and 726 will be described later with reference to FIG. 8, further description on it will not be provided herein.

Also, the controller 130 may manage the map segments 712, 714, 716, 718, 720, 722, 724 and 726 loaded into the first pattern zone 700 based on Most Recently Used (MRU)/Least Recently Used (LRU) schemes. FIG. 7 exemplarily shows MRU map segment 702 and LRU map segments 704. Particularly, the controller 130 may maintain the map segments 712, 714, 716, 718, 720, 722, 724 and 726 in the second buffer 700, which is the first pattern zone 700, or discard them after performing a map flush operation onto the memory device 150 according to the MRU/LRU schemes. Herein, the controller 130 may manage a list (e.g., an MRU/LRU list) for the map segments 712, 714, 716, 718, 720, 722, 724 and 726 stored in the first pattern zone 700.

Also, the controller 130 may read the first group user data from the memory blocks of the memory device 150 through the map segments 712, 714, 716, 718, 720, 722, 724 and 726 of the first group map data loaded into the first pattern zone 700, and then store the first group user data that are read from the memory device 150 into the first buffer 510 included in the memory 144 of the controller 130, and transfer the first group user data stored in the first buffer 510 to the host 102 in response to the first group read commands. Herein, when the controller 130 reads the first group user data from the memory blocks of the memory device 150, as described above, the controller 130 may read the first group user data from the memory blocks of the memory device 150 and then store them in the memory 144 of the controller 130 through the buffers 628, 648, 668 and 688 which respectively correspond to the memory dies, the planes, or the memory blocks in the memory device 150. Since the read operation of the first group user data is described before in detail with reference to FIGS. 5 and 6, further description on it will not be provided herein.

When the controller 130 receives second group read commands from the host 102, the controller 130 may detect a pattern of the second group read commands, a pattern of second group read command operations corresponding to the second group read commands, or a pattern of second group data corresponding to the second group read command operations, particularly, second group user data. Herein, the controller 130 may detect that the second group read commands, the second group read command operations, or the second group user data are of the second pattern. In other words, the controller 130 may detect that the second group read commands are sequential read commands, or the second group read command operations corresponding to the second group read commands are sequential read operations, or the second group user data corresponding to the second group read command operations are sequential user data.

Also, when the second group read command is decided as the sequential user data, i.e., the second pattern, the controller 130 may allocate as the first pattern zone 700_1 and the second pattern zone 700_2 to the second buffer 700. Particularly, since the second group read commands, the second group read command operations, or the second group user data are of the second pattern, the controller 130 may allocate the second buffer 700 as the first pattern zone 700_1 corresponding to the first group read commands and the second pattern zone 700_2 corresponding to the second group read commands, while allocating the second buffer 700 is allocated as the first pattern zone 700 corresponding to the first group read commands received from the host 102. Herein, the controller 130 may allocate as the second pattern zone 700_2 to a portion of the memory zone of the first pattern zone 700 for storing LRU map segments of the first pattern zone 700 in the second buffer 700 included in the memory 144 of the controller 130.

Also, the controller 130 may load the map segments 762, 764, 766, 768, 770 and 772 of the first group map data for the first group user data into the memory 144 of the controller 130 to perform the first group read command operations, in other words, to read the first group user data from the memory device 150. Herein, since the first group read commands, the first group read command operations, or the first group user data are of the first pattern, the controller 130 may load the map segments 762, 764, 766, 768, 770 and 772 of the first group map data corresponding to the first pattern into the first pattern zone 700_1 in the second buffer 700 included in the memory 144 of the controller 130.

Also, the controller 130 may load a map segment 782 of the second group map data for the second group user data into the memory 144 of the controller 130 to perform the second group read command operations, in other words, to read the second group user data from the memory device 150. Herein, since the second group read commands, the second group read command operations, or the second group user data are of the second pattern, the controller 130 may load the map segment 782 of the second group map data corresponding to the second pattern into the second pattern zone 700_2 in the second buffer 700 included in the memory 144 of the controller 130.

Herein, the map segments 762, 764, 766, 768, 770 and 772 of the first group map data corresponding to the first pattern may have the first unit size, e.g., a size of 2K, and the controller 130 may load each of the map segments 762, 764, 766, 768, 770 and 772 of the first group map data corresponding to the first pattern into the first pattern zone 700_1 by units of the first unit size.

Also, the map segment 782 of the second group map data corresponding to the second pattern may have a second unit size, e.g., a size of 32K, and the controller 130 may load the map segment 782 of the second group map data corresponding to the second pattern into the second pattern zone 700_2 by units of the second unit size. Herein, the second unit size may have a large-capacity size as much as an integer multiple of the first unit size. Particularly, the second buffer 700 second pattern zone 700_2 may be dynamically allocated as the second pattern zone 700_2 second buffer 700 based on the size of the map segment 782 of the second group map data loaded into the second pattern zone 700_2.

In other words, when the map segments 762, 764, 766, 768, 770 and 772 of the first group map data do not exist in the first pattern zone 700_1 of the second buffer 700, the controller 130 may read the map segments 762, 764, 766, 768, 770 and 772 of the first group map data from the memory blocks of the memory device 150, and load them into the first pattern zone 700_1. Herein, as described above, the controller 130 may read map segments 762, 764, 766, 768, 770 and 772 from the memory blocks of the memory device 150 and then load them into the memory 144 of the controller 130 through the buffers 628, 648, 668 and 688 which respectively correspond to the memory dies, the planes, or the memory blocks in the memory device 150. Herein, each of the map segments 762, 764, 766, 768, 770 and 772 of the first group map data may be read from the memory blocks of the memory device 150 by units of the first unit size, and then the read map segments may be loaded into the memory 144 of the controller 130 by units of the first unit size through the page buffers. Since the loading operation of the map segments 762, 764, 766, 768, 770 and 772 will be described later with reference to FIG. 8, further description on it will not be provided herein.

Also, when the map segment 782 of the second group map data does not exist in the second pattern zone 700_2 of the second buffer 700, the controller 130 may read the map segment 782 of the second group map data from the memory blocks of the memory device 150 and load them into the second pattern zone 700_2. Herein, as described above, the controller 130 may read the map segment 782 from the memory blocks of the memory device 150 and load the map segment 782 into the memory 144 of the controller 130 through a plurality of buffers 628, 648, 668 and 688 which respectively correspond to a plurality of memory dies, a plurality of planes, or a plurality of memory blocks in the memory device 150. Herein, the map segment 782 of the second group map data may be read from the memory blocks of the memory device 150 through an interleaving method for the planes or memory dies by units of the second unit size, and then the read map segments may be loaded into the memory 144 of the controller 130 by units of the second unit size from the page buffers. Since the loading operation of the map segment 782 will be described later with reference to FIG. 8, further description on it will not be provided herein.

Also, the controller 130 may manage the map segments 762, 764, 766, 768, 770 and 772 loaded into the first pattern zone 700_1 based on Most Recently Used (MRU)/Least Recently Used (LRU) schemes. Particularly, the controller 130 may maintain the map segments 762, 764, 766, 768, 770 and 772 in the first pattern zone 700_1, or discard them after performing a map flush operation onto the memory device 150 according to the MRU/LRU schemes. Herein, the controller 130 may manage a list (e.g., an MRU LRU list) for the map segments 762, 764, 766, 768, 770 and 772 stored in the first pattern zone 700_1.

Also, as command operations or background operations are performed according to the map segment 782 loaded into the second pattern zone 700_2, the controller 130 may manage the map segment 782 loaded into the second pattern zone 700_2. In other words, the controller 130 may perform the command operations or background operations according to the map segment 782 loaded into the second pattern zone 700_2, and then the controller 130 may discard the map segment 782 loaded into the second pattern zone 700_2 by performing the map flush operation of flushing into the memory device 150.

Herein, in accordance with the embodiment of the present invention, for the sake of convenience in description, a case where the single map segment 782 of the second unit size is loaded into the second pattern zone 700_2 is taken as an example and described. However, a plurality of map segments for the second group map data may be loaded into the second pattern zone 700_2. Herein, the map segments for the second group map data that are loaded into the second pattern zone 700_2 may be managed based on the MRU/LRU schemes. Herein, when a plurality of the map segments for the second group map data are loaded into the second pattern zone 700_2, the size of the second pattern zone 700_2 may increase in the memory 144 of the controller 130 when compared with the size of the first pattern zone 700_1. In other words, when a plurality of the map segments for the second group map data are loaded into the second pattern zone 700_2, the number or size of the map segments for the second group map data may increase more than that of the map segments for the first group map data. Particularly, when there are only the map segments for the second group map data in the memory 144 of the controller 130, the operation performance for the first group read command operations may be deteriorated. In accordance with the embodiment of the present invention, as described above, one map segment 782 having the second unit size may be loaded into the second pattern zone 700_2. Herein, the map segment 782 currently loaded into the second pattern zone 700_2 may be discarded from the second pattern zone 700_2 such that, another map segment for the second group map data is loaded into the second pattern zone 700_2 after the command operations and background operations is performed according to the currently loaded map segment 782.

Also, the controller 130 may read the first group user data from the memory blocks of the memory device 150 through the map segments 762, 764, 766, 768, 770 and 772 of the first group map data loaded into the first pattern zone 700_1, and then store the first group user data that are read from the memory device 150 into the first buffer 510 included in the memory 144 of the controller 130, and transfer the first group user data stored in the first buffer 510 to the host 102 in response to the first group read commands. Herein, when the controller 130 reads the first group user data from the memory blocks of the memory device 150, as described above, the controller 130 may read the first group user data from the memory blocks of the memory device 150 and then store them in the memory 144 of the controller 130 through the buffers 628, 648, 668 and 688 which respectively correspond to the memory dies, the planes, or the memory blocks in the memory device 150. Since the read operation of the first group user data is described before in detail with reference to FIGS. 5 and 6, further description on it will not be provided herein.

Also, the controller 130 may read the second group user data from the memory blocks of the memory device 150 through the map segment 782 of the second group map data loaded into the second pattern zone 700_2, and then store the second group user data that are read from the memory device 150 into the first buffer 510 included in the memory 144 of the controller 130, and transfer the second group user data stored in the first buffer 510 to the host 102 in response to the second group read commands. Herein, when the controller 130 reads the second group user data from the memory blocks of the memory device 150, as described above, the controller 130 may read the second group user data from the memory dies, the planes, or the memory blocks of the memory device 150 through an interleaving method for the planes or memory dies, and then store the second group user data in the memory 144 of the controller 130 through the buffers 628, 648, 668 and 688 which respectively correspond to the memory dies, the planes, or the memory blocks in the memory device 150. Since the read operation of the second group user data is described before in detail with reference to FIGS. 5 and 6, further description on it will not be provided herein.

Figure 8:
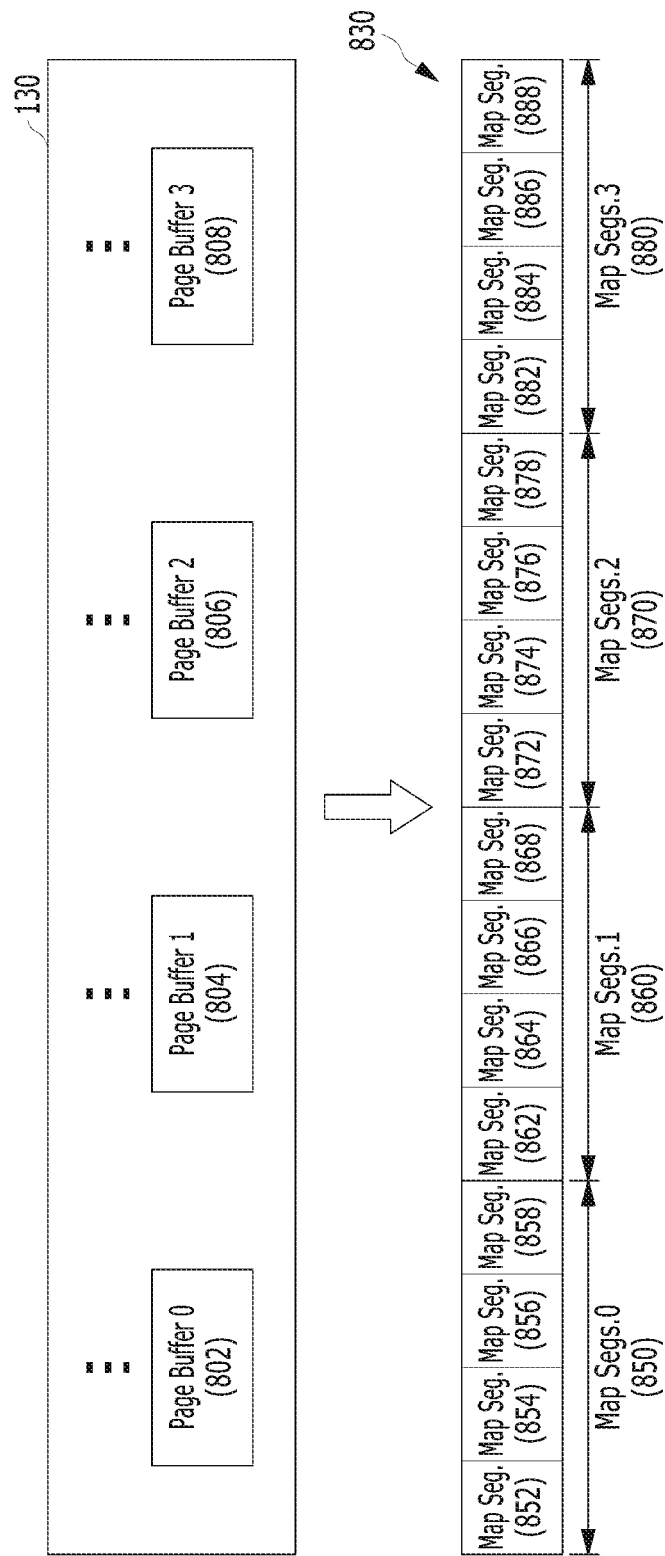

Subsequently, referring to FIG. 8, as described above, when the controller 130 reads the map segments 762, 764, 766, 768, 770 and 772 of the first group map data or the map segment 782 of the second group map data from the memory blocks of the memory device 150, the controller 130 may read them from the memory blocks of the memory device 150 into the memory 144 of the controller 130 through the buffers, e.g., page buffers 802, 804, 806 and 808, which respectively correspond to the memory dies, the planes, or the memory blocks in the memory device 150. Herein, in the embodiment of the present invention, for the sake of convenience in description, a case where the page buffers 802, 804, 806 and 808 respectively correspond to a plurality of planes, that is, a case where a page buffer 0 802 corresponds to a plane 0 in the memory device 150, and a page buffer 1 804 corresponds to a plane 1 in the memory device 150, and a page buffer 2 806 corresponds to a plane 2 in the memory device 150, and a page buffer 3 808 corresponds to a plane 3 in the memory device 150 is taken as an example and described in detail.

In short, the controller 130 may read map segments 0 850 from the memory blocks included in the plane 0 of the memory device 150 and store the map segments 0 850 in the page buffer 0 802, and load the map segments 0 850 stored in the page buffer 0 802 into the memory 144 of the controller 130. Also, the controller 130 may read map segments 1 860 from the memory blocks included in the plane 1 of the memory device 150 and store the map segments 1 860 in the page buffer 1 804, and load the map segments 1 860 stored in the page buffer 1 804 into the memory 144 of the controller 130. Also, the controller 130 may read map segments 2 870 from the memory blocks included in the plane 2 of the memory device 150 and store the map segments 2 870 in the page buffer 2 806, and load the map segments 2 870 stored in the page buffer 2 806 into the memory 144 of the controller 130. Also, the controller 130 may read map segments 3 880 from the memory blocks included in the plane 3 of the memory device 150 and store the map segments 3 880 in the page buffer 3 808, and load the map segments 3 880 stored in the page buffer 3 808 into the memory 144 of the controller 130. Hereafter, in the memory system in accordance with the embodiment of the present invention, an operation that the controller 130 loads the map segments 762, 764, 766, 768, 770 and 772 of the first group map data and the map segment 782 of the second group map data into the memory 144 of the controller 130 will be described in detail by taking an example.

For example, when the controller 130 loads a first map segment 768 into the memory 144 of the controller 130 among the map segments 762, 764, 766, 768, 770 and 772 of the first group map data, the controller 130 may read the first map segment 768 from the memory blocks of the memory device 150, e.g., the memory blocks of the plane 0, and store the read first map segment 768 in the page buffer 0 802 as a first map segment 852 of the map segments 0 850. Herein, the first map segment 768 may be read from the memory blocks of the plane 0 by units of the first unit size, and thus the first map segment 852 of the map segments 0 850 may be stored in the page buffer 0 802 by units of the first unit size. The controller 130 then may load the first map segment 852 stored in the page buffer 0 802 into the first pattern zone 700_1 by units of the first unit size. In short, the controller 130 may load the first map segment 768 of the first unit size into the first pattern zone 700_1.

Also, when the controller 130 loads a second map segment 766 into the memory 144 of the controller 130 among the map segments 762, 764, 766, 768, 770 and 772 of the first group map data, the controller 130 may read the second map segment 766 from the memory blocks of the memory device 150, e.g., the memory blocks of the plane 0, and store the read second map segment 766 in the page buffer 0 802 as a second map segment 854 of the map segments 0 850. Herein, the second map segment 766 may be read from the memory blocks of the plane 0 by units of the first unit size, and thus the second map segment 854 of the map segments 0 850 may be stored in the page buffer 0 802 by units of the first unit size. The controller 130 then may load the second map segment 854 stored in the page buffer 0 802 into the first pattern zone 700_1 by units of the first unit size. In short, the controller 130 may load the second map segment 766 of the first unit size into the first pattern zone 700_1.

Also, when the controller 130 loads a third map segment 764 into the memory 144 of the controller 130 among the map segments 762, 764, 766, 768, 770 and 772 of the first group map data, the controller 130 may read the third map segment 764 from the memory blocks of the memory device 150, e.g., the memory blocks of the plane 1, and store the read third map segment 764 in the page buffer 1 804 as a first map segment 862 of the map segments 1 860. Herein, the third map segment 764 may be read from the memory blocks of the plane 1 by units of the first unit size, and thus the first map segment 862 of the map segments 1 860 may be stored in the page buffer 1 804 by units of the first unit size. The controller 130 then may load the first map segment 862 stored in the page buffer 1 804 into the first pattern zone 700_1 by units of the first unit size. In short, the controller 130 may load the third map segment 764 of the first unit size into the first pattern zone 700_1.

Also, when the controller 130 loads a fourth map segment 762 into the memory 144 of the controller 130 among the map segments 762, 764, 766, 768, 770 and 772 of the first group map data, the controller 130 may read the fourth map segment 762 from the memory blocks of the memory device 150, e.g., the memory blocks of the plane 2, and store the read fourth map segment 762 in the page buffer 2 806 as a first map segment 872 of the map segments 2 870. Herein, the fourth map segment 762 may be read from the memory blocks of the plane 2 by units of the first unit size, and thus the first map segment 872 of the map segments 2 870 may be stored in the page buffer 2 806 by units of the first unit size. The controller 130 then may load the first map segment 872 stored in the page buffer 2 806 into the first pattern zone 700_1 by units of the first unit size. In short, the controller 130 may load the fourth map segment 762 of the first unit size into the first pattern zone 700_1.

Herein, as described above, the controller 130 may read each of the map segments 762, 764, 766, 768, 770 and 772 of the first group map data from the memory blocks of the memory device 150 by units of the first unit size and then store the map segments 762, 764, 766, 768, 770 and 772 in the corresponding page buffers 802, 804, 806 and 808, respectively, and load the map segments stored in the page buffers 802, 804, 806 and 808 into the first pattern zone 700_1 by units of the first unit size. In short, the controller 130 may perform a single read operation to the memory blocks of the memory device 150 or a single loading operation into the first pattern zone 700_1 by units of the first unit size for each map segment among the map segments 762, 764, 766, 768, 770 and 772 of the first group map data. Also, as described above, the map segments 762, 764, 766, 768, 770 and 772 of the first group map data that are loaded into the first pattern zone 700_1 may be managed based on the MRU/LRU schemes.

Also, when the controller 130 loads the map segment 782 of the second group map data into the memory 144 of the controller 130, the controller 130 may read the map segment 782 from the memory blocks of the memory device 150. For example, the controller 130 may read the map segment 782 from the memory blocks of the plane 0, the memory blocks of the plane 1, the memory blocks of the plane 2, and the memory blocks of the plane 3 through an interleaving method for memory dies or the planes of the memory device 150. Herein, the map segment 782 of the second group map data may be read from the memory blocks of the memory device 150 by units of the second unit size. For example, the map segment 782 of the second group map data may be read from the memory blocks of the plane 0, the memory blocks of the plane 1, the memory blocks of the plane 2, and the memory blocks of the plane 3 by units of the second unit size.

The map segment 782 of the second group map data which is read by units of the second unit size may be stored in the page buffer 0 802 as map segments 0 850, in the page buffer 1 804 as map segments 1 860, in the page buffer 2 806 as map segments 2 870, and in the page buffer 3 808 as map segments 3 880 by units of a third unit size, e.g., a size of 8K, individually. In other words, the map segments 0 850 of the map segment 782 of the second group map data may be read from the memory blocks of the plane 0 and stored in the page buffer 0 802 by units of the third unit size. Also, the map segments 1 860 of the map segment 782 of the second group map data may be read from the memory blocks of the plane 1 and stored in the page buffer 1 804 by units of the third unit size. Also, the map segments 2 870 of the map segment 782 of the second group map data may be read from the memory blocks of the plane 2 and stored in the page buffer 2 806 by units of the third unit size. Also, the map segments 3 880 of the map segment 782 of the second group map data may be read from the memory blocks of the plane 3 and stored in the page buffer 3 808 by units of the third unit size. The controller 130 may load the map segments 850, 860, 870 and 880 that are stored in the page buffers 802, 804, 806 and 808 into the second pattern zone 700_2 by units of the second unit size. In short, the controller 130 may load the map segment 782 of the second group map data into the second pattern zone 700_2 by units of the second unit size.

Herein, as described above, the controller 130 may read map segment 782 of the second group map data from the memory blocks of the memory device 150 through an interleaving method for the memory dies or planes of the memory device 150 by units of the second unit size and then store the map segment 782 in the page buffers 802, 804, 806 and 808 respectively by units of the third unit size, and load the map segment 782 of the second group map data stored in the page buffers 802, 804, 806 and 808 into the second pattern zone 700_2 by units of the second unit size. In short, the controller 130 may perform a single read operation to the memory blocks of the memory device 150 or a single loading operation into the second pattern zone 700_2 by units of the second unit size for the map segments 0 850, the map segments 1 860, the map segments 2 870, and the map segments 3 880 of the map segment 782 of the second group map data.

In the memory system in accordance with the embodiment of the present invention, which is described above, the memory 144 of the controller 130 may be efficiently used by dynamically allocating a map buffer or a map cache to the memory 144 of the controller 130 after detecting the commands received from the host 102, command operations corresponding to the commands, or data corresponding to the command operations, or detecting background operations or data corresponding to the background operations. Also, the operation performance of the memory system may be improved by efficiently loading and managing the map segments of the map data with the memory 144 of the controller 130. Hereafter, an operation of processing data in the memory system in accordance with the embodiment of the present invention will be described in detail with reference to FIG. 9.

Figure 9:
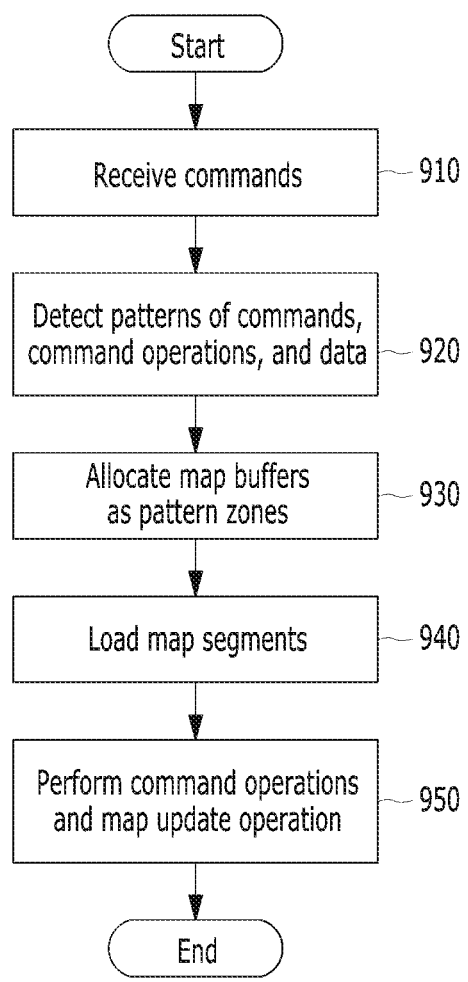
FIG. 9 is a flowchart describing a data processing operation in the memory system in accordance with the embodiment of the present invention.

FIG. 9 is a flowchart describing a data processing operation in the memory system in accordance with the embodiment of the present invention.

Referring to FIG. 9, in step 910, the memory system 110 may receive a plurality of commands from the host 102. In step 920, the memory system 110 may detect a pattern of the commands received from the host 102, a pattern of a plurality of command operations corresponding to the commands, and a pattern of data corresponding to the command operations. Herein, the memory system 110 may detect whether the pattern of the commands, the command operations, or the data, particularly, user data, are the first pattern or the second pattern. Also, when background operations for the memory device 150 are performed, the memory system 110 may detect whether the pattern of the background operations or the data, particularly, the user data, corresponding to the background operations are the first pattern or the second pattern.

In step 930, a map buffer or a map cache of the memory 144 of the controller 130 may be allocated in order to load the commands, the command operations, the background operations, or map segments of map data corresponding to the data into the memory 144 of the controller 130. Particularly, the map buffer or the map cache may be allocated as pattern zones based on the detected pattern. For example, the memory 144 of the controller 130 may be dynamically allocated as the first pattern zone and the second pattern zone.

Subsequently, in step 940, the map segments of the map data corresponding to each pattern may be read from the memory blocks of the memory device 150, and then they are loaded into the memory 144 of the controller 130 through the buffers included in the memory device 150, i.e., the first pattern zone and the second pattern zone.

In step 950, the command operations may be performed based on the map segments loaded into the first pattern zone and the second pattern zone, and the map segments may be updated according to the performance of the command operations.

Herein, since the operation of allocating the map buffer or the map cache, for example, dynamically allocating the pattern zones, to the memory 144 of the controller 130 and loading the map segments of the map data to the pattern zones based on the pattern of the commands, the pattern of the command operations corresponding to the commands, the pattern of the data, particularly, the user data, corresponding to the command operations, the pattern of the background operations, and the pattern of the data, particularly, the user data, corresponding to the background operations, is described before in detail with reference to FIGS. 5 to 8, further description on it will not be provided herein. Hereafter, a data processing system and electronic devices to which the memory system 110 including the memory device 150 and the controller 130 which are described above with reference to FIGS. 1 to 9 in accordance with the embodiment of the present invention will be described in detail below with reference to FIGS. 10 to 18.

Figure 10:
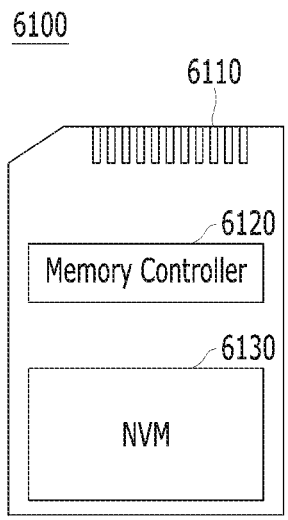
FIGS. 10 to 18 are diagrams schematically illustrating application examples of the data processing system shown in FIG. 1, in accordance with various embodiment of the present invention.

FIG. 10 is a diagram schematically illustrating another example of the data processing system including the memory system in accordance with the present embodiment. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
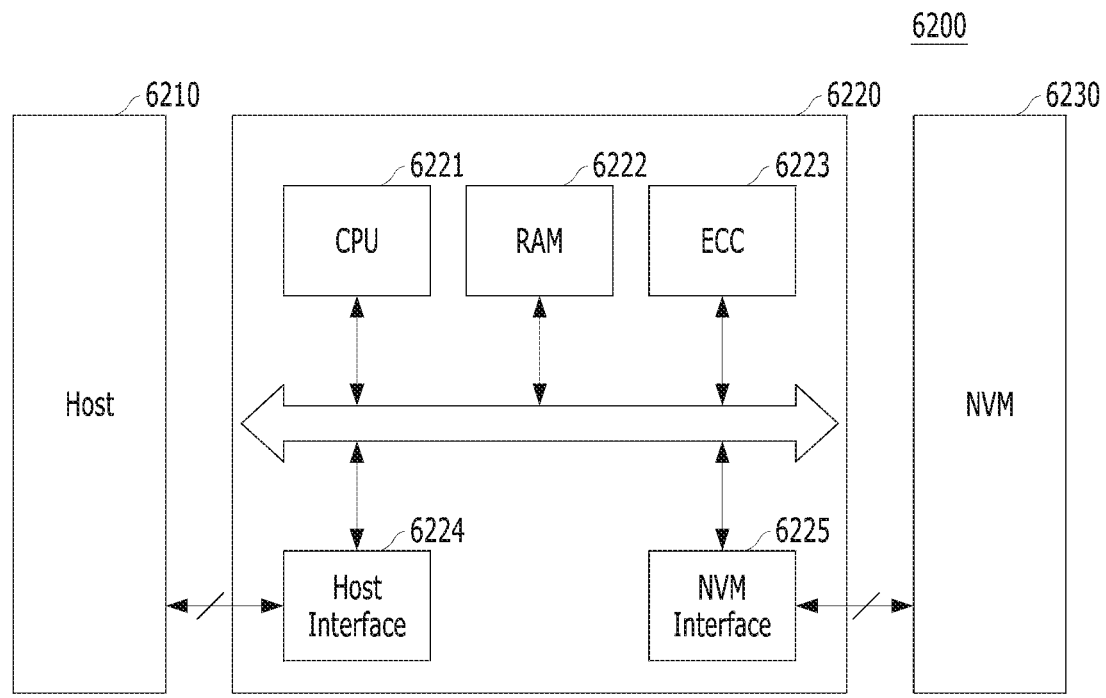

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
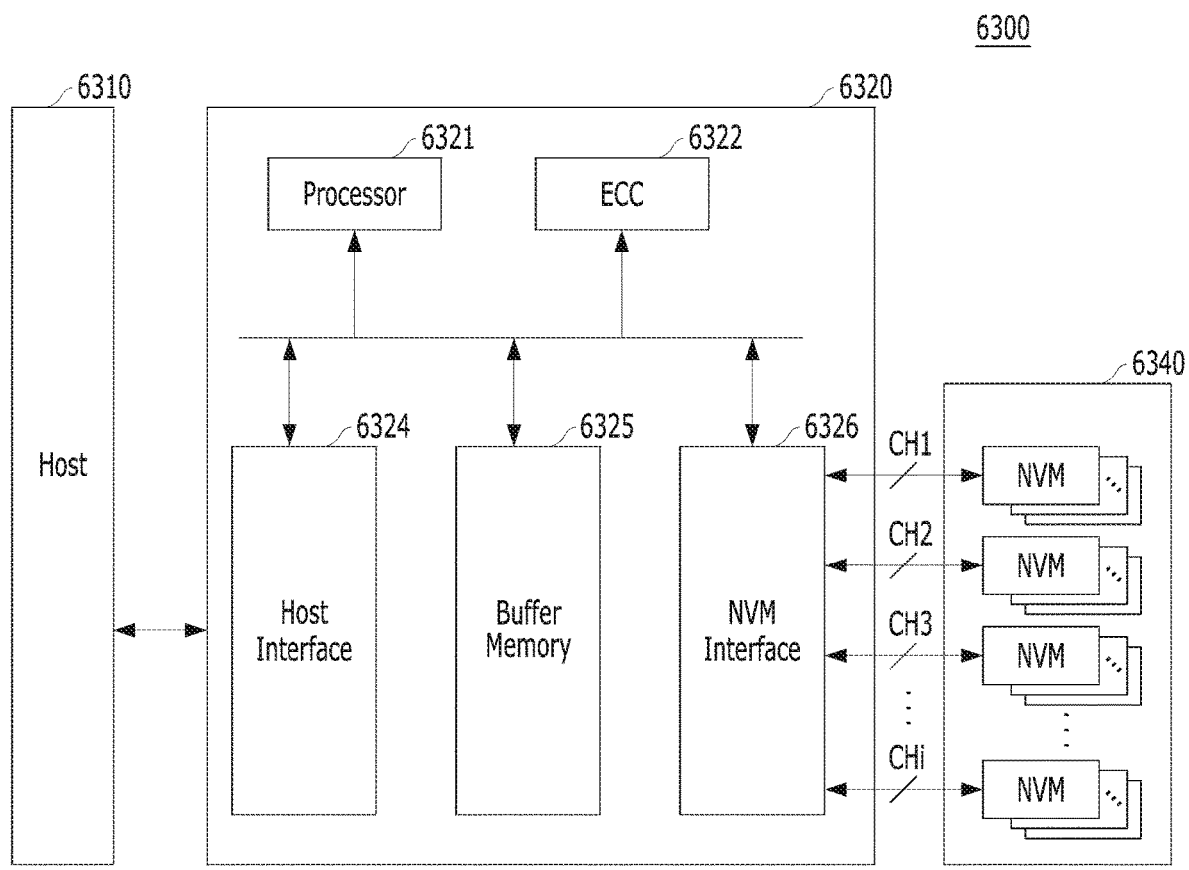

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
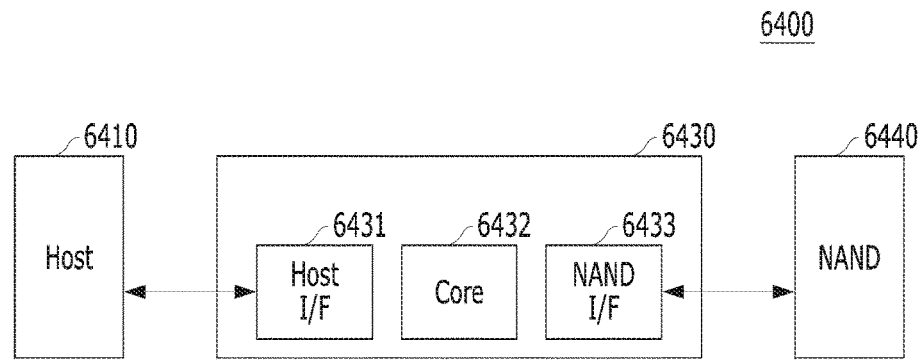

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
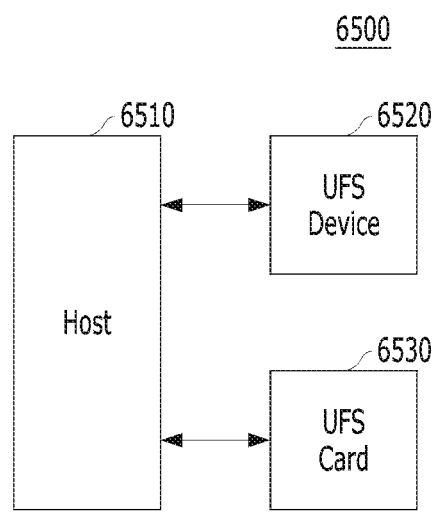

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
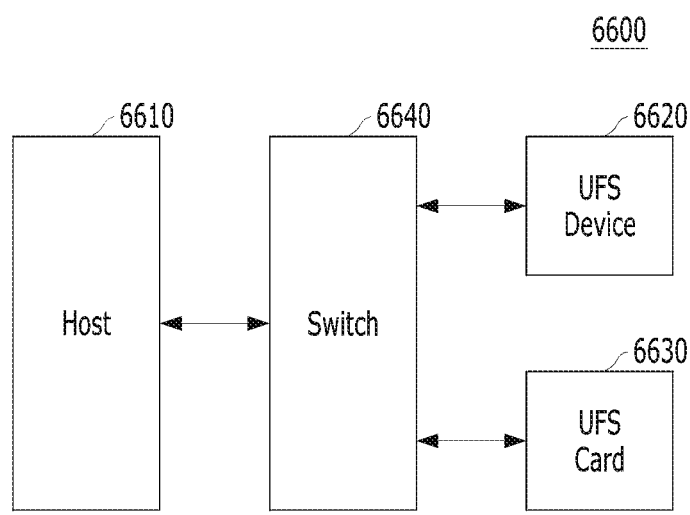

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
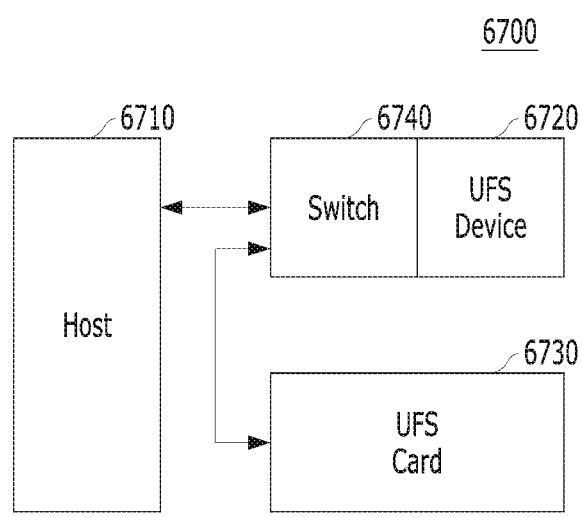

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
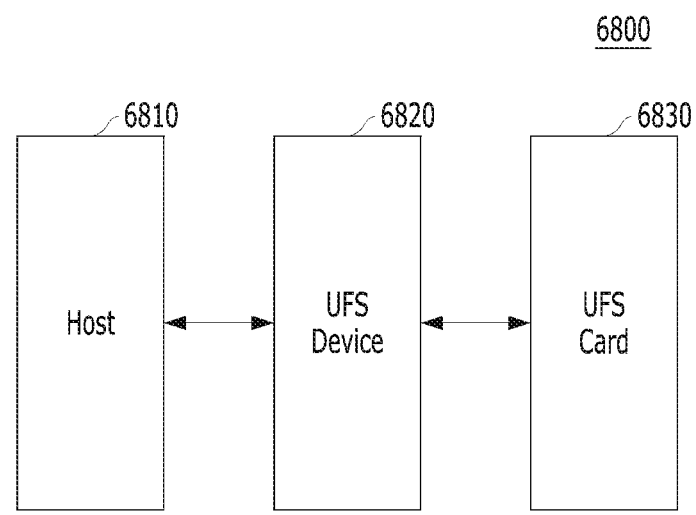

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
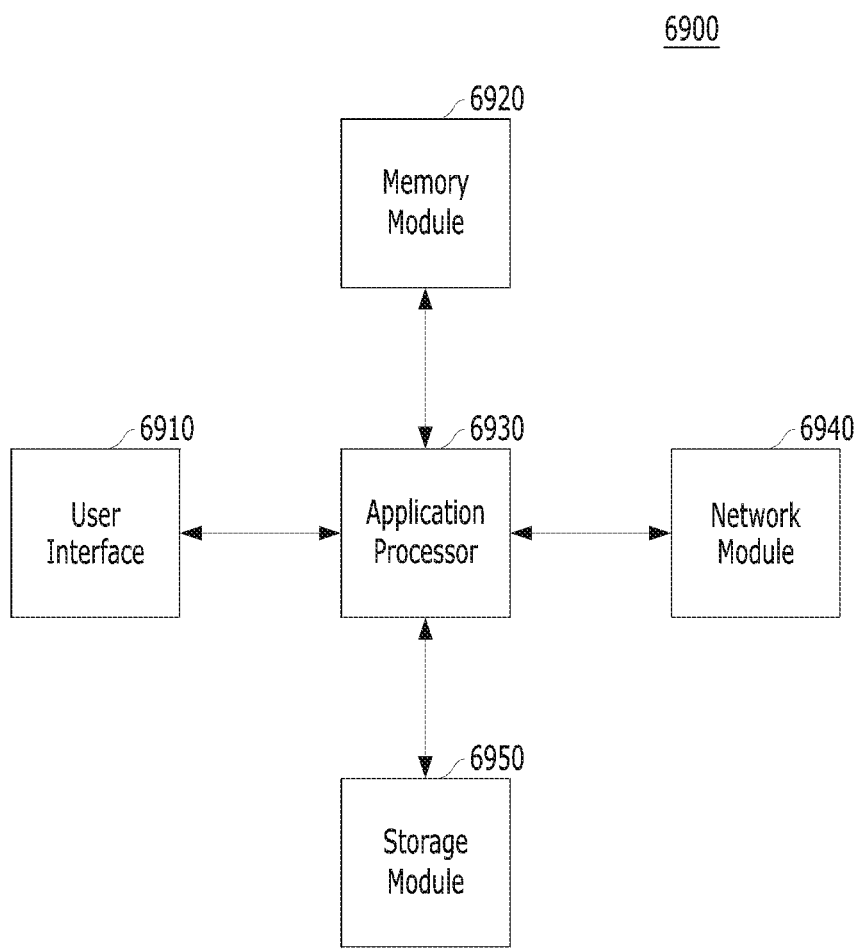

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, a memory system and a method for operating the memory system are capable of processing data with a memory device rapidly and stably by minimizing complexity and performance deterioration of the memory system and maximizing the utility efficiency of the memory device.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
   a memory device that includes a plurality of memory dies each of which includes a plurality of planes, each of which includes a plurality of memory blocks that store data; and
   a controller including a memory, and configured to:
   receive a plurality of commands from a host;
   perform command operations corresponding to the received commands in the memory blocks;
   detect patterns of the commands, the command operations, and user data corresponding to the command operations;
   dynamically allocate pattern zones in the memory based on the detected patterns; and
   load map segments of map data corresponding to the commands, the command operations, and the user data into the pattern zones,
   wherein at least a pattern zone among the pattern zones is dynamically selected according to a size of the map segments of the map data, to be loaded thereto.

2. The memory system of claim 1, wherein the controller loads map segments of a first map data corresponding to a first pattern among the patterns into a first pattern zone among the pattern zones, and
   loads map segments of a second map data corresponding to a second pattern among the patterns into a second pattern zone among the pattern zones.

3. The memory system of claim 2, wherein the first pattern is a pattern in which information on the commands, the command operations, and the user data are discontinuous, and
   the second pattern is a pattern in which information on the commands, the command operations, and the user data are continuous.

4. The memory system of claim 2, wherein the controller reads each of the map segments of the first map data based on a first unit size from the memory blocks, and loads each of the read map segments of the first map data into the first pattern zone based on the first unit size.

5. The memory system of claim 4, wherein the controller reads each map segment of the first unit size among the map segments of the first map data; stores the read map segment of the first unit size in buffers corresponding to at least one among the memory blocks, the planes, and the memory dies; and then loads the stored map segment of the first unit size into the first pattern zone.

6. The memory system of claim 2, wherein the controller reads map segments of the second map data based on a second unit size from the memory blocks and loads the map segments into the second pattern zone based on the second unit size.

7. The memory system of claim 6, wherein the controller reads all map segments of the second unit size among the map segments of the second map data; stores all the read map segments of the second unit size in buffers corresponding to at least one among the memory blocks, the planes, and the memory dies; and then loads all the stored map segments of the second unit size into the second pattern zone.

8. The memory system of claim 7, wherein the controller reads all the map segments of the second unit size from the memory blocks through an interleaving method for the planes or the memory dies.

9. The memory system of claim 2, wherein the map segments of the first map data that are loaded into the first pattern zone are managed by MRU (Most Recently Used) and LRU (Least Recently Used), and the map segments of the second map data that are loaded into the second pattern zone are managed according to performance of the command operations.

10. The memory system of claim 2, wherein the controller detects whether background operations for the memory device or user data corresponding to the background operations are of the first pattern or the second pattern.

11. A method for operating a memory system, comprising:
receiving a plurality of commands for a memory device that includes a plurality of memory dies, each of which includes a plurality of planes, each of which includes a plurality of memory blocks for storing data from a host;
detecting patterns of the commands, the command operations corresponding to the commands, and user data corresponding to the command operations;
dynamically allocating pattern zones in the memory based on the detected patterns; and
loading map segments of map data corresponding to the commands, the command operations, and the user data into the pattern zones,
wherein at least a pattern zone among the pattern zones is dynamically selected according to a size of the map segments of the map data, to be loaded thereto.

12. The method of claim 11, wherein the loading of the map segments of the map data corresponding to the commands, the command operations, and the user data into the pattern zones includes:
loading map segments of a first map data corresponding to a first pattern among the patterns into a first pattern zone among the pattern zones; and
loading map segments of a second map data corresponding to a second pattern among the patterns into a second pattern zone among the pattern zones.

13. The method of claim 12, wherein the first pattern is a pattern in which information on the commands, the command operations, and the user data are discontinuous, and
the second pattern is a pattern in which information on the commands, the command operations, and the user data are continuous.

14. The method of claim 12, wherein in the loading of the map segments of the first map data corresponding to the first pattern among the patterns into the first pattern zone among the pattern zones,
each of the map segments of the first map data is read based on a first unit size from the memory blocks, and each of the read map segments of the first map data is loaded into the first pattern zone based on the first unit size.

15. The method of claim 14, wherein the loading of the map segments of the first map data corresponding to the first pattern among the patterns into the first pattern zone among the pattern zones includes:
reading each map segment of the first unit size among the map segments of the first map data;
storing the read map segment of the first unit size in buffers corresponding to at least one among the memory blocks, the planes, and the memory dies; and
loading the map segment of the first unit size stored in the buffers into the first pattern zone.

16. The method of claim 12, wherein in the loading of the map segments of the second map data corresponding to the second pattern among the patterns into the second pattern zone among the pattern zones,
map segments of the second map data are read based on a second unit size from the memory blocks and the map segments are loaded into the second pattern zone based on the second unit size.

17. The method of claim 16, wherein the loading of the map segments of the second map data corresponding to the second pattern among the patterns into the second pattern zone among the pattern zones includes:
reading all map segments of the second unit size among the map segments of the second map data;
storing all the read map segments of the second unit size in buffers corresponding to at least one among the memory blocks, the planes, and the memory dies; and
loading all the map segments of the second unit size stored in the buffers into the second pattern zone.

18. The method of claim 17, wherein in the reading of all the map segments of the second unit size among the map segments of the second map data,
all the map segments of the second unit size are read from the memory blocks through an interleaving method for the planes or the memory dies.

19. The method of claim 12, wherein the map segments of the first map data that are loaded into the first pattern zone are managed by MRU (Most Recently Used) and LRU (Least Recently Used), and
the map segments of the second map data that are loaded into the second pattern zone are managed according to performance of the command operations.

20. The method of claim 12, further comprising:
detecting whether background operations for the memory device or user data corresponding to the background operations are of the first pattern or the second pattern.

* * * * *